US006713009B2

(12) United States Patent
Van Gilst

(10) Patent No.: US 6,713,009 B2
(45) Date of Patent: Mar. 30, 2004

(54) METHOD AND APPARATUS FOR MOLDING PLASTICS WITH ELONGATED METALLIC CORES

(75) Inventor: Carl W. Van Gilst, Goshen, IN (US)

(73) Assignee: Rotational Molding Technologies, Inc., New Paris, IN (US)

( * ) Notice: Subject to any disclaimer, the term of this patent is extended or adjusted under 35 U.S.C. 154(b) by 0 days.

(21) Appl. No.: 09/946,197

(22) Filed: Sep. 5, 2001

(65) Prior Publication Data

US 2003/0042074 A1 Mar. 6, 2003

(51) Int. Cl.[7] .......................... B29C 41/08; B29C 41/20

(52) U.S. Cl. ........................ 264/263; 264/310; 264/311; 264/312; 425/144; 425/270; 425/435

(58) Field of Search ................................ 264/307, 308, 264/309, 310, 311, 301, 302, 303, 304, 305, 306, 312, 263; 425/144, 435, 270

(56) References Cited

U.S. PATENT DOCUMENTS

| | | | | |
|---|---|---|---|---|
| 4,123,307 A | * | 10/1978 | Lemelson | 156/172 |
| 4,515,547 A | * | 5/1985 | Rother et al. | 425/215 |
| 4,683,098 A | * | 7/1987 | Belleville et al. | 264/302 |
| 4,867,660 A | * | 9/1989 | Nagase et al. | 425/144 |
| 4,890,995 A | * | 1/1990 | Gray | 425/144 |
| 5,106,285 A | * | 4/1992 | Preston | 425/144 |
| 5,221,539 A | * | 6/1993 | Pallerberg et al. | 425/144 |
| 5,366,051 A | | 11/1994 | Bartnicki et al. | |
| 5,675,867 A | | 10/1997 | Howie, Jr. | |
| 5,776,405 A | * | 7/1998 | Prout et al. | 264/310 |
| 5,868,979 A | * | 2/1999 | Glenn | 264/40.6 |
| 6,019,590 A | * | 2/2000 | McNally | 425/470 |

FOREIGN PATENT DOCUMENTS

| | | | |
|---|---|---|---|
| DE | 1 220 111 B | * | 6/1966 |
| GB | 2 121 345 A | * | 12/1983 |
| GB | 2 179 290 A | * | 3/1987 |
| JP | 59-114019 | * | 6/1984 |

OTHER PUBLICATIONS

AG–CO Products http://www.ag–coproducts.com/egress.htm, 2 pages.

* cited by examiner

*Primary Examiner*—Stefan Staicovici
(74) *Attorney, Agent, or Firm*—Wendell E. Miller

(57) ABSTRACT

A rotomolded plastic wall and ladder structure (10, 50, or 58)), which may be an article such as a window well (10) or a manhole (50 or 58), includes a thermoplastic wall (12), a ladder (16) whose rungs (18) each include an elongated metallic core (20) and a thermoplastic sleeve (22). Mold apparatus (70) includes a thermoplastic rotomold (72), an elongated hollow metallic core (20) having a heating passage (74) therein, and means for flowing hot air through the heating passage (74). The method includes disposing the hollow metallic core in a mold, placing a quantity of a thermoplastic inside a mold, heating the mold, rotating the heated mold, flowing heated air through the hollow metallic core, and bonding a layer of the thermoplastic onto the hollow metallic core.

17 Claims, 2 Drawing Sheets

METHOD AND APPARATUS FOR MOLDING PLASTICS WITH ELONGATED METALLIC CORES

CROSS-REFERENCE TO RELATED APPLICATIONS

None

STATEMENT RE FEDERALLY SPONSORED RESEARCH OR DEVELOPMENT

Not Applicable

SEQUENCE LISTING

Not Applicable

BACKGROUND OF THE INVENTION

1. Field of the Invention

The present invention relates generally to molded articles with elongated metallic cores. More particularly the present invention pertains to rotomolded thermoplastic articles, such as window wells and manholes, with integrally molded ladders with rungs that include metallic cores, and both method and apparatus for making.

2. Description of the Related Art

Window wells serve a purpose that is included in their name. They are a well, or hole in the ground, that is juxtaposed against a window, and that allows light to reach a window. However, when there is human occupancy below grade, it is important to provide a way of escape in the event of fire, or other disaster.

Providing larger windows in a lower-level room allows the use of larger window wells, and providing windows that are higher not only allows more sunlight to enter, but also requires larger window wells.

As windows and window wells become larger, and particularly higher, they provide an excellent path for emergency egress, in that children and adults may literally step out of the room into the window well and up to safety.

However, with deeper window wells, some children, and some adults may not be able to climb out of the window well. To escape a burning building, but to be trapped in a window well, is not a satisfactory way of escaping a fire, and the laws of an increasing number of states are providing requirements for built-in ladders.

To meet the need for ladders in window wells, some manufacturers of galvanized steel window wells have riveted-ladders into their window wells, and one manufacturer of molded plastic window wells has molded terraced steps into the window well distal from the window.

While both galvanized window wells with ladders and molded plastic window wells have provided useful products, the riveted-ladder window well may fail due to rust, and the terraced-step window well is excessively expensive to manufacture, and does not provide egress that is as safe as that provided by a ladder with rungs that can be grasped by the hands of children and the hands of arthritic adults.

BRIEF SUMMARY OF THE INVENTION

A wall and ladder structure, which may be in the form of such articles as a window well or a manhole, includes a thermoplastic wall, a plurality of ladder rungs that include both hollow metallic cores that are thermoplastically attached to the wall, and a thermoplastic sleeve that covers each of the metallic cores and that is integral with the thermoplastic wall.

The method of making the wall and ladder structure includes: placing a quantity of a thermoplastic inside a mold, heating the mold, rotating the heated mold, disposing at least a portion of a hollow metallic core inside the mold, flowing heated air through the hollow metallic core during at least a portion of time wherein the rotating step is performed, and bonding a layer of the thermoplastic onto the hollow metallic core during at least a portion of the rotating step.

The mold apparatus includes an exterior-contour mold, or thermoplastic rotomold, a hollow metallic core, being at least partially disposed inside the mold, that provides a healing passage therein that includes an inlet and that includes an outlet that communicates with furnace air outside the mold, and an air supply port being connected to the inlet.

In a first aspect of the present invention, a method for rotomolding a thermoplastic article which comprises placing a quantity of a thermoplastic inside a rotomold, heating the rotomold, and rotating the heated rotomold, the improvement comprises: disposing at least a portion of a metallic core, that includes a heating passage, in the rotomold; flowing heated air through the heating passage during at least a portion of time wherein the rotating step is performed; bonding a layer of the thermoplastic onto the metallic core during at least a portion of the rotating step; the disposing step comprises providing a pair of openings through the rotomold, and clamping the metallic core with respect to the rotomold; and the flowing step comprises communicating the heated air through one of the openings and into the heating passage, and communicating the heated air from the heating passage through the other of the openings to air outside the rotomold.

In a second aspect of the present invention, a method for rotomolding a thermoplastic article which comprises placing a quantity of a thermoplastic inside a rotomold, heating the rotomold, and rotating the heated rotomold, the improvement comprises: disposing at least a portion of a metallic core, (hat includes a heating passage, in the rotomold; flowing heated air through the heating passage during at least a portion of time wherein the rotating step is performed: bonding a layer of the thermoplastic onto the metallic core during at least a portion of the rotating step; the disposing step comprises providing first and second openings in the rotomold, inserting first and second clamp bars through respective ones of the openings, and clamping the metallic core between the clamp bars; and the flowing step comprises communicating the heated air into one of the clamp bars and out of another of the clamp bars.

In a third aspect of the present invention, mold apparatus for rotationally molding thermoplastic articles comprises: a thermoplastic rotomold; a hollow metallic core being disposed in the rotomold; and means for flowing hot air through the hollow metallic core.

In a third aspect of the present invention, mold apparatus for rotationally molding thermoplastic articles comprises: a rotomold having a pair of openings therethrough; an elongated metallic core having a heating passage therein, ends and being at least partially disposed inside the rotomold; a clamp bar that includes a longitudinal passage and that extends through the openings to clamp the ends of the metallic core with respect to the rotomold such that the longitudinal passage is in communication with the heating passage; and a hot air passage that includes an inlet port, the heating passage, the longitudinal passage and a transverse passage that communicates air from one of the openings into the heating passage and from the heating passage through another of the openings to air outside the rotomold.

DETAILED DESCRIPTION OF THE INVENTION

Figure 3:
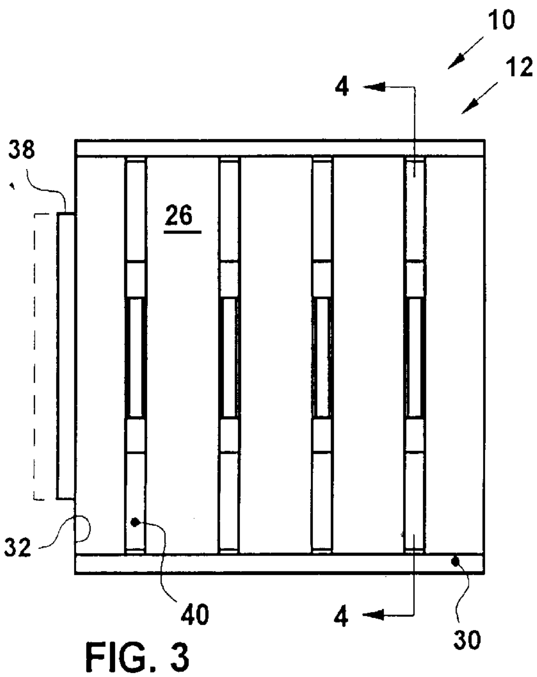
FIG. 3 is an inside elevation of the rotomolded window well of FIGS. 1 and 2, taken substantially as shown by view line 3—3 of FIG. 1, showing the rungs of the ladder positioned in respective ones of the bracing ribs, and also showing the flange that extends downwardly from the partial bottom.
Figure 1:
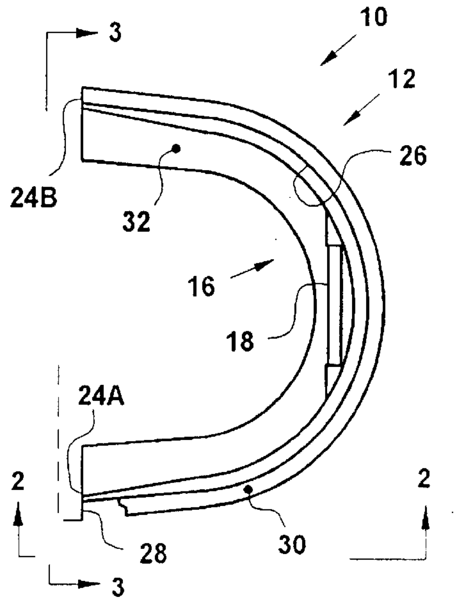
FIG. 1 is a top view of a rotomolded wall and ladder structure, or rotomolded window well, showing an outwardly-extending top flange, showing, by breaking out a portion of the top flange, one of two outwardly-extending side flanges that are used to attach the window well to a building structure, showing a partial bottom, and showing a top view of one of the ladder rungs.
Figure 4:
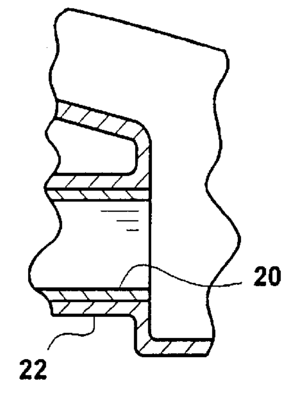
FIG. 4 is a partial cross section of the rotomolded window well of FIGS. 1–3, taken substantially as shown by section line 4—4 of FIG. 3, showing one of the ladder rungs molded into the wall, and showing one of the hollow metallic cores molded inside the ladder rung.
Figure 2:
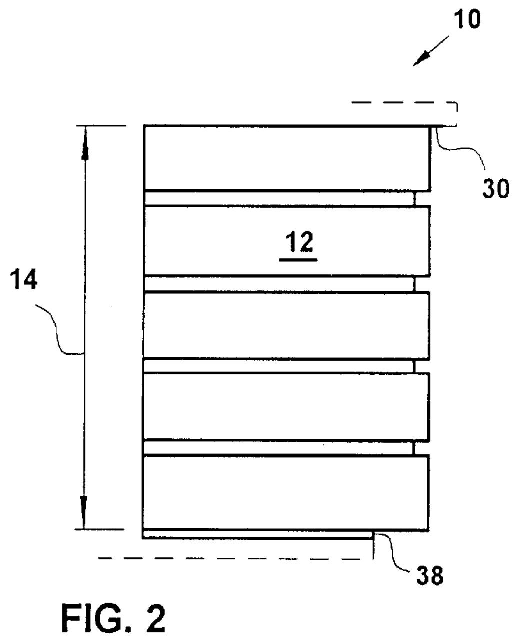
FIG. 2 is a side elevation of a rotomolded wall and ladder structure, or rotomolded window well, taken substantially as shown by view line 2—2 of FIG. 1, showing the outwardly-extending top flange, showing four bracing ribs that are horizontally-disposed and inwardly-extending, showing a bottom flange that depends downwardly from a partial bottom, and showing, by phantom line, a bottom that is cut from the window well after molding.

Referring now to FIGS. 1–3, a rotomolded plastic wall and ladder structure, or rotomolded plastic window well, 10 includes a curved thermoplastic wall 12 having a height 14, and a ladder 16 that includes a plurality of ladder rungs 18 that are vertically spaced, as shown. Each of the ladder rungs 18 includes a hollow elongated metallic core, or tubular metallic core, 20, and a thermoplastic sleeve 22 as shown in FIG. 4.

The thermoplastic sleeve 22 is molded onto a respective one of the hollow metallic cores 20, and the thermoplastic sleeve 22 is molded integrally with the thermoplastic wall 12.

The wall 12 includes first and second ends, 24A and 24B, a concave inner surface 26 upon which the ladder rungs 18 are disposed, a pair of attaching flanges 28 that extend outwardly from respective ones of the ends, 24A and 24B, an outwardly-extending top flange 30, an integrally-molded partial bottom 32 that extends inwardly of the curved wall 12, and a downward flange 38 that depends from the bottom 32.

The wall and ladder structure 10 further includes a plurality of bracing ribs 40 that are horizontally-disposed and inwardly-extending, and that increase the structural integrity of the structure 10. The ladder rungs 18 are disposed vertically within respective ones of the ribs 40.

Figure 5:
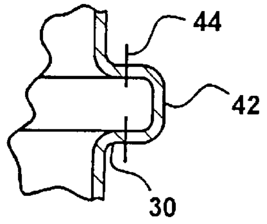
FIG. 5 is an enlarged and partial cross section of the window well of FIGS. 1–4 and a portion that is molded between two window wells that are molded top-to-top, and then removed to provide an outwardly-extending flange for both window wells.

Preferably, two of the wall and ladder structures 10 are molded with the outwardly-extending top flanges 30 proximal to each other, and with a U-shaped portion 42, of FIG. 5, connecting the top flanges 30. After molding, the two wall and ladder structures 10 are separated by cutting at lines 44, thereby leaving the outwardly-extending top flanges 30.

Figure 6:
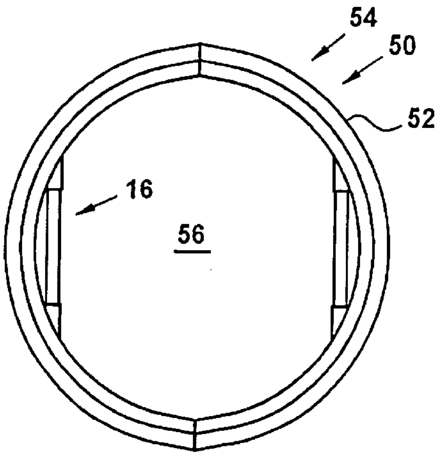
FIG. 6 is a top view of a manhole that includes two halves that are each much the same as the window well of FIGS. 1–5, but when bolted together, they form a manhole for laddered human access to and from a lower level.

Referring now to FIG. 6, a manhole or plastic wall and ladder structure 50 includes two identical manhole halves 52 that are attached to each other by any suitable means, such as the attaching flanges 28 of the window well 10 of FIGS. 1–3, thereby providing a continuous outer wall 54 that provides an enclosed passageway 56 inside the continuous outer wall 54. As shown in FIG. 6, preferably, the manhole halves 52 are not perfectly semicircular, but are shaped, as shown, to nest together for shipping.

Figure 7:
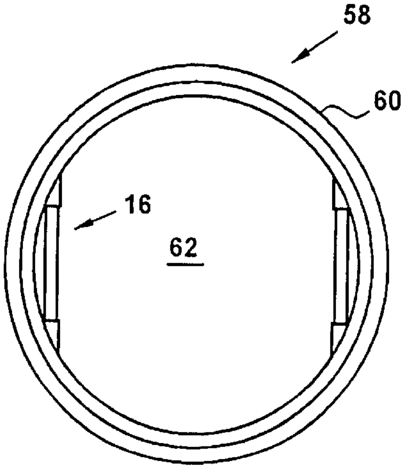
FIG. 7 is a top view of a manhole similar to that of FIG. 6, except the two halves of FIG. 6 are molded integrally in FIG. 7.

Referring now to FIG. 7, a manhole or plastic wall and ladder structure 58 includes a continuous outer wall 60, an enclosed passageway 62, and at least one ladder 16.

As shown in FIGS. 6 and 7, two of the ladders 16 of FIGS. 1–4 are included in one manhole, 50 or 58. However, as will be seen as the tooling is discussed, with only minor modification to the tooling, one of the manhole halves 52 could be molded without the ladder 16, so that the manhole 50 would have only one ladder 16. In like manner, the manhole 58 could be molded with only one ladder 16.

Referring now to FIGS. 6 and 7, the manholes 50 and 58 may be stacked to provide manholes of greater height, not shown, by any suitable means, such as providing bottom flanges, not shown, that are similar, or the same as, the top flanges 30 of FIG. 2, and bolting the two flanges together.

Figure 8:
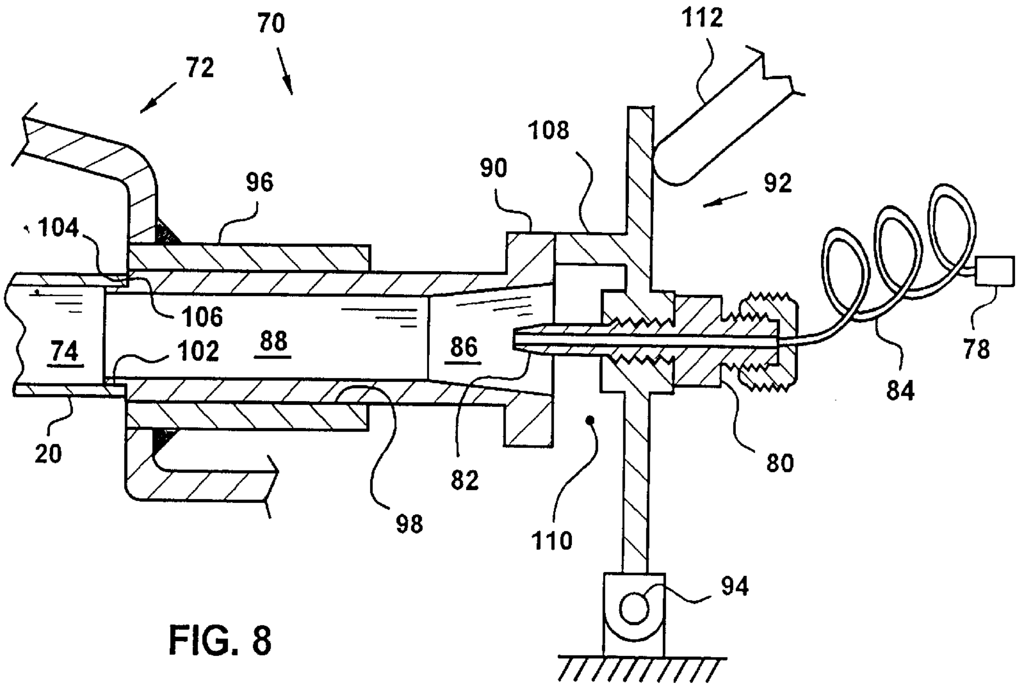
FIG. 8 is an enlarged and partial cross section of the mold for rotomolding the window well of FIGS. 1–3, the manhole of FIG. 6, and the manhole of FIG. 7, taken substantially the same as FIG. 4, showing one of the elongated hollow metallic cores clamped into the mold by a tubular clamp bar and a clamp plate, and showing a nozzle in the clamp plate that injects hot air through the tubular clamp bar and the hollow metallic core.

Referring now to FIG. 8, mold apparatus 70 for rotationally molding thermoplastic articles, such as the window well 10, the manhole 50, or the manhole 58, includes an exterior-contour mold, or thermoplastic rotomold, 72, a plurality of the metallic cores 20 of FIG. 4, each of which includes a heating passage 74 therethrough, an inlet port 78 that is connected to a nozzle fitting 80 having a nozzle 82, but that may have an air-to-air heat exchanger 84 interposed between the inlet port 78 and the nozzle fitting 80, a venturi throat 86 that is a part of a clamp bar passage or longitudinal passage 88 that extends through a tubular clamp bar 90, a clamp plate 92 that is pivotally attached by means of a pivot anchor 94, and a guide sleeve 96 for the clamp bar 90 that includes an opening 98.

As shown in FIG. 8, the clamp bars 90 each include a pilot portion 102 that pilotingly engages the heating passage 74 of one of the cores 20, the clamp bars 90 each include a clamping face 104 that clampingly engages an end 106 of one of the cores 20, and the clamp plate 92 includes a clamp foot 108 that clampingly engages the clamp bar 90 and that provides a transverse passage 110 between the clamp bar 90 and the clamp plate 92.

Another clamp bar 90 with another clamp bar passage 88 and another pilot portion 102, another clamp plate 92 with another pivot anchor 94, and another guide sleeve 96 with another opening 98, not shown, same as those shown, are provided for another end, not shown, of the hollow metallic cores 20.

As shown in FIG. 8, the nozzle fitting 80 is threadingly inserted into the clamp plate 92, and a clamp device 112, which may be a manually actuated clamp, is provided to selectively allow the clamp plate 92 to be pivoted outwardly, thereby allowing the pilot portion 102 to be removed from the cores 20, to allow the clamp bar 90 to be removed from the sleeve 96, and to provide a releasably longitudinal clamping force on the ends 106 of the cores 20.

Although two of the clamp plates 92 are used, one for each end of one of the hollow metallic cores 20, the nozzle fittings 80 are used at only one end 106 of the cores 20, since hot air exits at another end 106 opposite to the end 106 wherein hot air is jetted into the heating passage 74 provided by the hollow metallic cores 20. Although not shown, one of the clamp plates 92 may be used for more than one of the cores 20.

As hot air is jetted into the venturi throat 86 by the nozzle 82, furnace air is drawn into the venturi throat 86 through the transverse passage 110, flows through the longitudinal passage 88, flows through the heating passage 74 provided by one of the hollow metallic cores 20, flows through another longitudinal passage 88 in another clamp bar 90, not shown, and out of another transverse passage 110, not shown, into furnace air.

With regard to the air-to-air heat exchanger 84, preferably at least 15.2 meters (50 feet) of 12.7 millimeter (0.50 inch) copper tubing is formed into a coil and is used to preheat compressed air that is supplied to the inlet port 78 before the compressed air is jetted into the venturi throat 86 by the nozzle 82.

Preferably, the thermoplastic rotomold 72 is made from sheets of aluminum and/or molded aluminum. However, preferably, the clamp bars 90 are made from a brass or bronze material that has a coefficient of heat transfer that is greater than that of aluminum, thereby optimizing heat transfer into the cores 20. However, for cores 20 with a L/D (length/diameter) ratio greater than eight, heat transfer through the clamp bars 90 is not sufficient to achieve satisfactory molding without flowing hot air through the cores 20, as taught herein.

The method of the invention comprises: placing a quantity of a thermoplastic inside a mold, heating the mold, rotating the heated mold, disposing at least a portion of a hollow metallic core in the mold, flowing heated air through the hollow metallic core during at least a portion of time wherein the rotating step is performed, and bonding a layer of the thermoplastic onto the hollow metallic core during at least a portion of the rotating step.

The method of the invention may additionally include: compressing air, heating the compressed air, discharging compressed air through a nozzle, pulling mold-furnace air through a venturi throat, providing a pair of openings through the mold, communicating the heated air in through one of the openings and out through the other of the openings, disposing a clamp bar through one of the openings, pressing the clamp bar against the hollow metallic core, providing a releasable longitudinal clamping force against an end of the hollow metallic core, communicating the heated air through one of the openings and into the hollow metallic core, and/or communicating the heated air from the hollow metallic core through the other of the openings to furnace air outside the mold.

The method of the invention may additionally include: providing first and second openings in the mold, inserting first and second clamp bars through respective ones of the openings, inserting first and second pilot portions of the clamp bars into respective ends of the hollow metallic core, and releasably clamping ends of the hollow metallic core between the clamp bars, communicating the heated air into one of the clamp bars and out of another of the clamp bars, using a hollow metallic core that has insufficient draft for successfully pulling the core from the thermoplastic article and leaving the core in the thermoplastic article subsequent to the bonding step, and/or using a hollow metallic core that includes sufficient draft for successfully pulling the core from the thermoplastic article and withdrawing the core from the thermoplastic article subsequent to the bonding step.

While specific apparatus and method have been disclosed in the preceding description, and while numbers have been inserted into the claims parenthetically, it should be understood that these specifics have been given for the purpose of disclosing the principles of the present invention, and that many variations thereof will become apparent to those who are versed in the art. Therefore, the scope of the present invention is to be determined by claims included herein without any limitation by numbers parenthetically inserted in the claims.

What is claimed is:

1. A method for rotomoiding a thermoplastic article which comprises placing a quantity of a thermoplastic inside a rotomold, heating said rotomold, and rotating said heated rotomold, the improvement which comprises:

a) disposing at least a portion of a metallic core, that includes a heating passage, in said rotomold;

b) flowing heated air through said heating passage during at least a portion of time wherein said rotating step is performed;

c) bonding a layer of said thermoplastic onto said metallic core during at least a portion of said rotating step;

d) said disposing step comprises providing a pair of openings through said rotomold, and clamping said metallic core with respect to said rotomold; and e) said flowing step comprises communicating said heated air through one of said openings and into said heating passage, and communicating said heated air from said heating passage through the other of said openings to air outside said rotomold.

2. A method as claimed in claim 1 in which said method further comprises leaving said metallic core in said thermoplastic article.

3. A method as claimed in claim 1 in which said method further comprises removing said metallic core from said thermoplastic article.

4. A method as claimed in claim 1 in which said flowing step further comprises discharging compressed air through a nozzle.

5. A method as claimed in claim 1 in which said flowing step further comprises:

a) discharging compressed air through a nozzle; and b) pulling a mold-furnace air through a venturi throat.

6. A method as claimed in claim 1 in which said flowing step further comprises:

a) compressing air;

b) heating said compressed air by heat exchange with mold-furnace air; and c) using said heated compressed air in said flowing step.

7. A method as claimed in claim 1 in which said flowing step further comprises:

a) compressing air;

b) heating said compressed air by heat exchange with mold-furnace air;

c) discharging said heated air through a nozzle; and d) pulling said mold-furnace air through a venturi throat.

8. A method for rotomolding a thermoplastic article which comprises placing a quantity of a thermoplastic inside a rotomold, heating said rotomold, and rotating said heated rotomold, the improvement which comprises:

a) disposing at least a portion of a metallic core, that includes a heating passage, in said rotomold;

b) flowing heated air through said heating passage during at least a portion of time wherein said rotating step is performed;

c) bonding a layer of said thermoplastic onto said metallic core during at least a portion of said rotating step;

d) said disposing step comprises providing first and second openings in said rotomold, inserting first and second clamp bars through respective ones of said openings, and clamping said metallic core between said clamp bars; and e) said flowing step comprises communicating said heated air into one of said clamp bars and out of another of said clamp bars.

9. A method as claimed in claim 8 in which said disposing step further comprises inserting first and second pilot portions of said clamp bars into respective ends of said metallic core.

10. A method as claimed in claim 8 in which said method further comprises leaving said core in said thermoplastic article subsequent to said bonding step.

11. A method as claimed in claim 8 in which:

a) said disposing step comprises disposing said metallic core with sufficient draft for successfully pulling said core from said thermoplastic article; and b) said method further comprises withdrawing said core from said thermoplastic article subsequent to said bonding step.

12. Mold apparatus (70) for rotationally molding thermoplastic articles which comprises:

a rotomold (72) having a pair of openings (98) therethrough;

an elongated metallic core (20) having a heating passage (74) therein, ends (106) and being at least partially disposed inside said rotomold;

a clamp bar that includes a longitudinal passage (88) and that extends through said openings to clamp said ends of said metallic core with respect to said rotomold such that said longitudinal passage (88) is in communication with said heating passage (74); and a hot air passage that includes an inlet port (78), said heating passage (74), said longitudinal passage (88) and a transverse passage (110) that communicates air from one of said openings into said heating passage and from said heating passage through another of said openings to air outside said rotomold.

13. Mold apparatus (70) as claimed in claim 12 in which:

said mold apparatus includes a clamp device (112) that releasably places a longitudinal clamping force onto one of said ends.

14. Mold apparatus (70) as claimed in claim 12 in which said hot air passage includes a nozzle (82) that is connected to said inlet port (78) and a venturi throat (86) that circumferentially surrounds said nozzle and that is connected to said heating passage (74) in said metallic core (20).

15. Mold apparatus (70) as claimed in claim 12 in which said hot air passage includes an air-to-air heat exchanger (84) that is interposed intermediate of said inlet port (78) and said heating passage (74).

16. Mold apparatus (70) as claimed in claim 12 in which said hot air passage includes said inlet port (78), an air-to-air heat exchanger (84) that is connected to said inlet port, a nozzle (82) that is connected to said heat exchanger, and a venturi throat (86) that circumferentially surrounds said nozzle and communicates with said heating passage (74) in said metallic core (20).

17. Mold apparatus (70) as claimed in claim 12 in which:

said mold apparatus includes clamp bars (90) that extend through said openings, that pilotingly engage said heating passage (74) proximal to respective ones of said ends, that clampingly engages said ends, and that each include a longitudinal passage (88) that communicates with said heating passage proximal to respective ends of said metallic core;

said hot air passage includes connection of said inlet port (78) to one of said longitudinal passages;

said communication of said heating passage with said air outside said mold comprises another one of said longitudinal passages in another one of said clamp bars;

said mold apparatus comprises a clamp plate (92) that is operatively attached to said mold apparatus and that operatively engages one of said clamp bars; and said mold apparatus comprises a clamp device (112) that is operatively attached to said mold apparatus and that operatively engages said clamp plate.

* * * * *